US005568362A

United States Patent [19]

Hansson

[11] Patent Number: 5,568,362
[45] Date of Patent: Oct. 22, 1996

[54] CABINET FOR HOUSING ELECTRONIC EQUIPMENT CONNECTABLE TO MACHINES OR POWER TOOLS FOR PERFORMING OPERATIONS

[75] Inventor: Gunnar C. Hansson, Stockholm, Sweden

[73] Assignee: Atlas Copco Tools AB, Nacka, Sweden

[21] Appl. No.: 124,970

[22] Filed: Sep. 21, 1993

[30] Foreign Application Priority Data

Sep. 25, 1992 [SE] Sweden .................................. 9202768

[51] Int. Cl.$^6$ ...................................................... H02B 1/10
[52] U.S. Cl. .......................... 361/736; 174/50; 312/223.6; 361/827; 439/620
[58] Field of Search ............................ 174/50, 59, 35 R, 174/52.1, 60; 455/347; 439/76, 133, 460, 462, 465, 620; 312/223.1, 223.6; 361/641, 679, 728, 736, 752, 759, 796, 800, 816, 826, 827

[56] References Cited

U.S. PATENT DOCUMENTS

| 2,953,625 | 9/1960 | Hasselhorn . | |
|---|---|---|---|
| 4,213,013 | 7/1980 | Perna | 179/98 |
| 4,242,721 | 12/1980 | Krolak | 361/415 |
| 4,493,951 | 1/1985 | Sanderson | 179/175.3 F |
| 4,614,844 | 9/1986 | Leeper | 179/175.1 R |
| 4,679,123 | 7/1987 | Young | 361/428 |
| 4,850,014 | 7/1989 | Gillis | 379/399 |
| 5,214,568 | 5/1993 | Heng | 361/395 |

FOREIGN PATENT DOCUMENTS 2217520  10/1989  United Kingdom .

Primary Examiner—Gerald P. Tolin
Attorney, Agent, or Firm—Frishauf, Holtz, Goodman & Woodward

[57] ABSTRACT

A cabinet for housing electronic equipment connectable to machines or power tools for performing operations, wherein connections are made with cables provided with single or multi contact connector plugs (19) received by single or multi contact jacks (17). The cabinet comprises a central casing (10), a door (13) and a partition wall (15) defining a connector chamber (16) inside the central casing (10) behind the door (13) and housing the jacks (17), such that the connector plugs (19) and jacks (17) are protected from environmental influence such as dust and/or splashing water or other fluids. The cables (18) extend into the casing (10) through openings (20) at the lower edge of the door (13). A lock (31, 32) on the door (13) enables protection against intentional as well as unintentional disconnection of the cables (18).

3 Claims, 3 Drawing Sheets

5,568,362

CABINET FOR HOUSING ELECTRONIC EQUIPMENT CONNECTABLE TO MACHINES OR POWER TOOLS FOR PERFORMING OPERATIONS

BACKGROUND OF THE INVENTION

This invention relates to a cabinet for housing electronic equipment for process control and monitoring of machines or power tools for performing operations, wherein the machines or power tools are connectable to the cabinet by means of one or more cables provided with single or multi contact connector plugs. The cabinet comprises a casing with a door and one or more single or multi contact jacks for receiving said single or multi contact connector plugs.

The main object of the invention is to create an improved cabinet for housing electronic process control and monitoring equipment, wherein the cable connector plugs and jacks are safely protected both against environmental factors like dust and splashing of water or other fluids and against damage, intentional as well as unintentional.

It is also an object of the invention to provide a cabinet for electronic process control and monitoring equipment where the single or multi contact plugs and jacks are protected against electromagnetic interference and where the length of the internal wiring is reduced substantially.

BRIEF DESCRIPTION OF THE DRAWINGS

A preferred embodiment of the invention is described below in detail with reference to the accompanying drawings.

DETAILED DESCRIPTION

Figure 5:
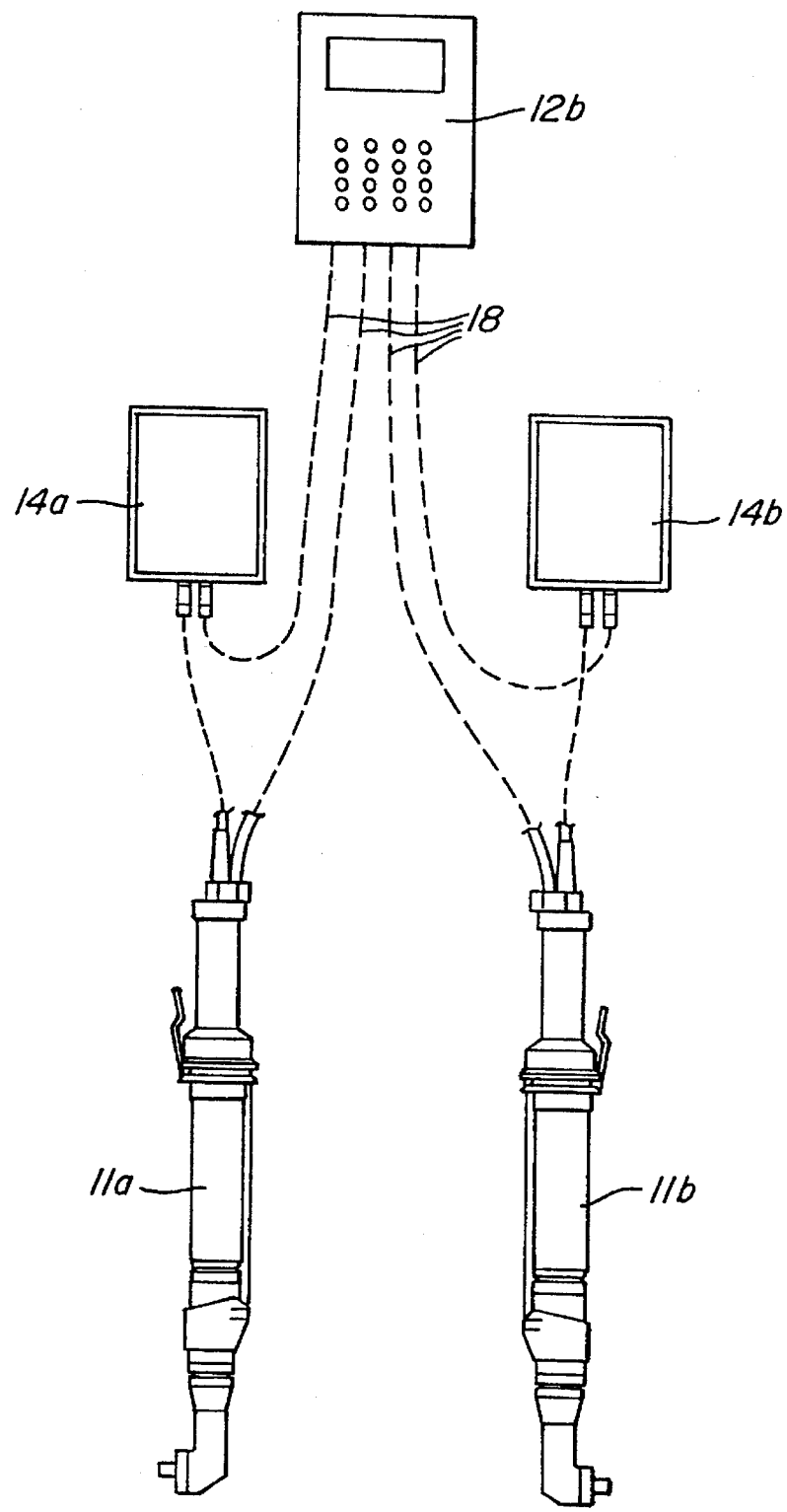
FIG. 5 shows schematically a cabinet according to the invention connected to two screw joint tightening tools and their respective drive units.

The cabinet shown in the drawing figures comprises a central casing 10 housing the electronic process control and monitoring equipment. As shown in FIG. 5, this electronic equipment is connected to electric power nutrunners 11a, 11b as well as to drive units 14a, 14b. The nutrunners 11a, 11b are provided with torque and rotation angle sensing means from which signals corresponding to the actual operation parameters are delivered to the control and monitoring equipment. Control signals based on the received signals and on data stored in the control means are delivered to the drive units 14a, 14b to make the nutrunners 11a, 11b operate as desired.

Figure 1:
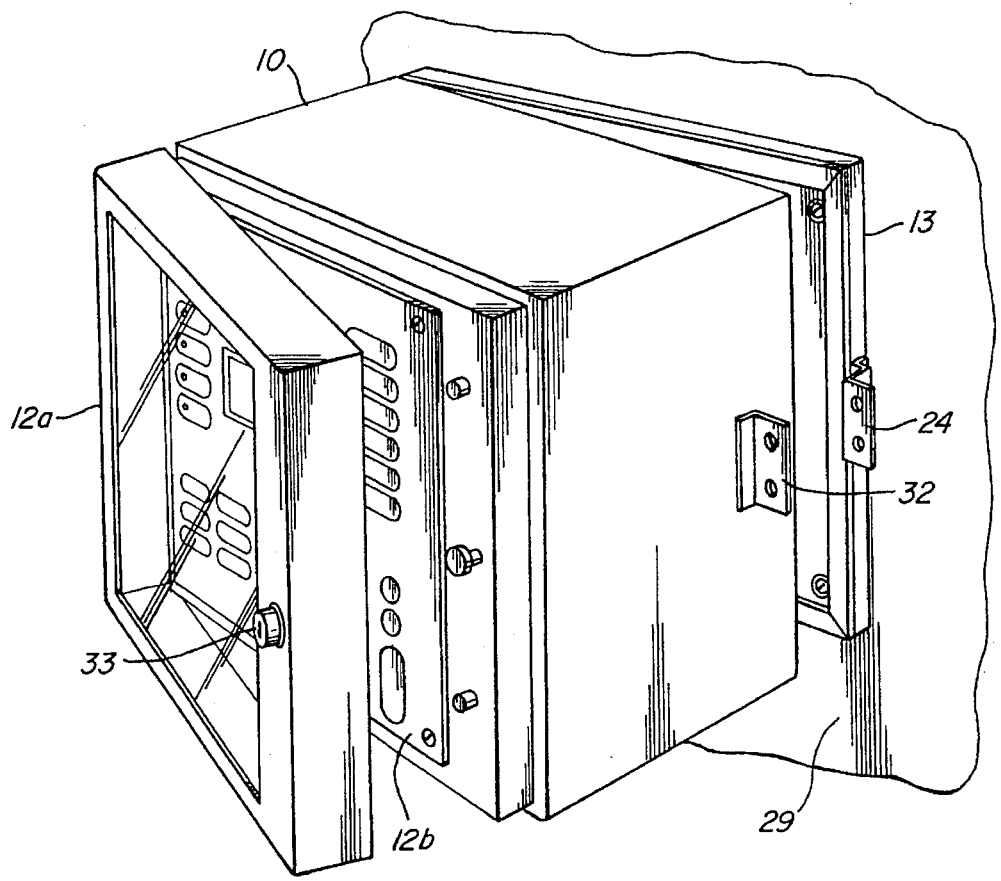
FIG. 1 shows a front end perspective view of a cabinet according to the invention.

The cabinet also comprises a front door 12a and a back door 13 through which access is made to parts of the central casing 10. As illustrated in FIG. 1, the front door 12a comprises a glass pane (transparent) window which covers a display and control panel 12b. The actual operation data may be observed on the panel 12b through the front door window, whereas desired operational parameter values can only be set or changed with the front door 12a open.

Figure 2:
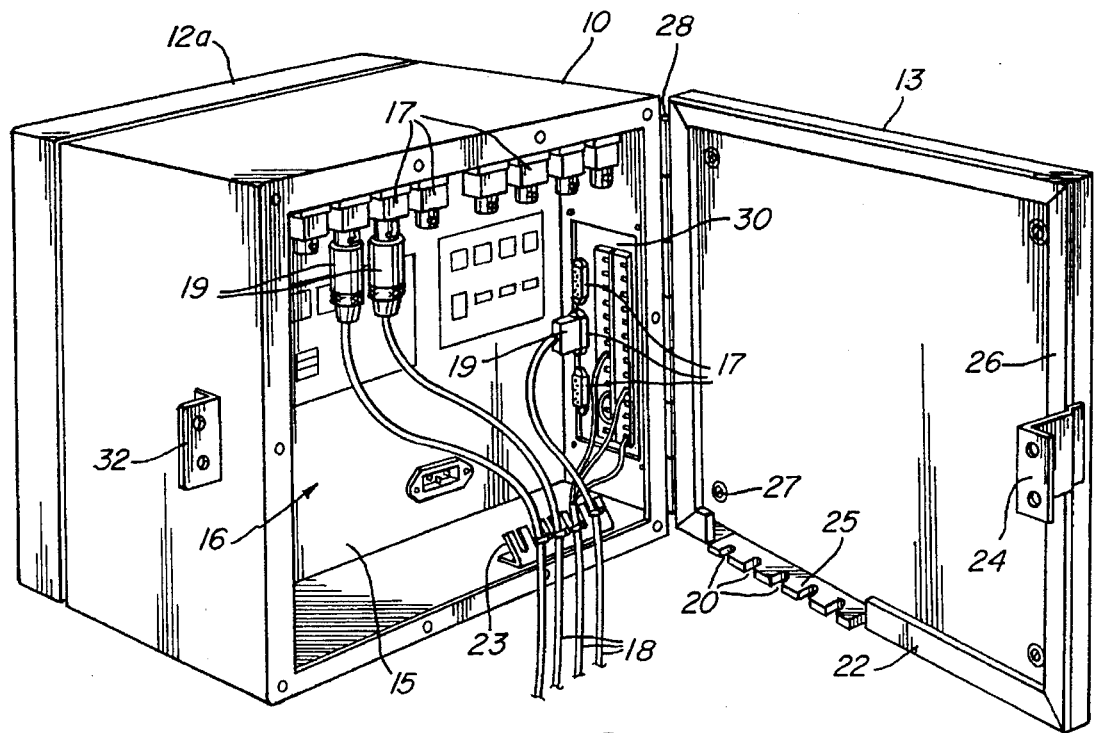
FIG. 2 shows a perspective view of the cabinet in FIG. 1 illustrating the cable and back door arrangement.
Figure 3:
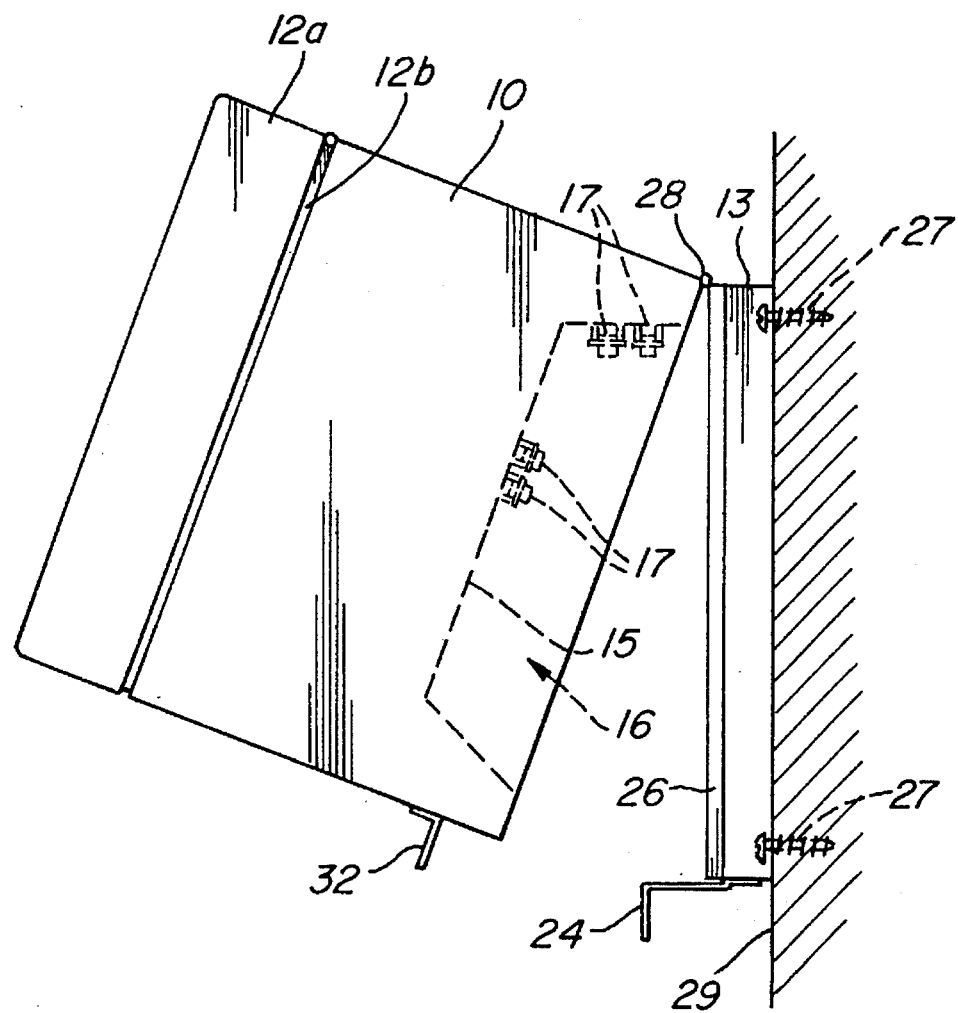
FIG. 3 shows a schematic top view of a cabinet according to the invention, illustrating the cabinet mounted on a vertical wall via its back door.

As illustrated in FIGS. 2 and 3, the central casing 10 is divided by a partition wall 15. This wall 15 separates the main part of the electronic equipment from a connector chamber 16 in which a number of multi contact jacks 17 are located.

A number of cables 18 carrying multi contact connector plugs 19 connect the drive units 14a, 14b and the parameter sensing means of the nutrunners 11a, 11b to the electronic equipment via the jacks 17. All cables 18 enter the connector chamber 16 via openings 20 at the lower edge 22 of the back door 13 and are secured to a tie bracket 23 mounted inside the central casing 10.

The cable openings 20 as well as the back door 13 as a whole are provided with seals 25 and 26, respectively, for sealing off the connector chamber 16 and, thereby, protecting the cable connections against environmental factors like dust and splashing water or other fluids. The cable opening seal 25 comprise a conductive material so as to prevent electromagnetic influence on the signals transmitted through the cables 18. The entire central casing 10 and the back door 13 are made of a conductive material such as sheet steel.

Due to the fact that the cable openings 20 are small enough just to let through the cables 18, and that the cables 18 are secured to the tie bracket 23 in the central casing 10, it is not possible to disconnect the connector plugs 19 without opening the back door 13.

The cabinet is intended to be mounted on a vertical structure such as a wall 29. To that end, the back door 13 is provided with a number of holes for mounting screws 27. The central casing 10 is connected to the back door 13 via hinges 28.

Figure 4:
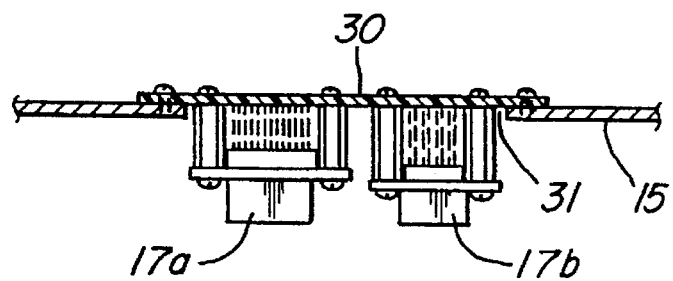
FIG. 4 shows, on a larger scale, a circuit board with multi contact jacks.

The multi contact jacks 17 in the connector chamber 16 are mounted directly on the circuit boards of the signal processing means. As illustrated in FIG. 4, a circuit board 30 is mounted on the partition wall 15 in the cabinet, and two multi contact jacks 17a, 17b extend from the circuit board 30 through an opening 31 in the wall 15 into the connector chamber 16.

Since there are effective seals 25, 26 provided on the back door 13 and in the cable openings 20, the circuit boards 30 as well as the multi contact connectors are well protected against environmental influence, such as dust, splashing water, etc. This means that a simpler and much less expensive type of connector plugs and jacks may be used, and enables the above described arrangement with the connector jacks 17 mounted directly on the circuit boards 30. This in turn results in a very much simplified wiring inside the cabinet.

By locating the cable connections in the form of single or multi contact cable plugs and jacks inside a connector chamber which is closed by a well sealed-off door, there is obtained not only the above mentioned advantages as to a simplified wiring and connector arrangement, but the connector means is protected against intentional as well as unintentional damage or disconnection and, thereby, unnecessary disturbance of the tool operation is avoided. Brackets 24, 32 on the back door 13 and the central casing 10 are intended for locking the back door 13 in its closed position by means of a screw joint and, when desired, also by a padlock. Thereby, access to the cable connections may be reserved for authorized personnel only. Also, the front door 12a is provided with a lock 33 to enable only authorized personnel to have access to the control panel 12b.

I claim:

1. A cabinet housing electronic equipment for process control and/or monitoring of machines or power tools for performing operations, and which machines or power tools are connectable to the electronic equipment in the cabinet by means of at least one cable (18) provided with at least one multi-contact connector plug (19), the cabinet comprising:

a casing (10) having a display and control panel (12b);

a first openable door (12a) connected to said casing (10) and having a transparent window covering said display and control panel (12b); a second openable door (13) connected to said casing (10);

at least one multi-contact jack (17) which receives said at least one multi-contact connector plug (19) of said cables;

an electronic equipment chamber in said casing (10);

a connector chamber (16) at least partly defined by said second door (13) and enclosing said at least one jack (17) and said at least one plug (19);

a partition wall (15) in said casing (10) and separating said connector chamber (16) from said electronic equipment, said partition wall (15) comprising at least one circuit board (30) on which said at least one jack (17) is mounted; and at least one opening (20) provided at an edge of said door (13) and through which said at least one cable (18) passes.

2. The cabinet according to claim 1, further comprising:

mounting means (27) on said second door (13) for attachment of said cabinet to a support structure (29); and at least one hinge (28) hingedly coupling said casing (10) to said second door (13) such that said second door, when attached to said support structure (29), supports said casing (10).

3. The cabinet according to claim 1, wherein said transparent window comprises a glass pane.

* * * * *